(No Model.)  2 Sheets—Sheet 1.
H. W. STONE.
SELF VENTING BUNG.
No. 511,065.  Patented Dec. 19, 1893.
*Fig. 1,*
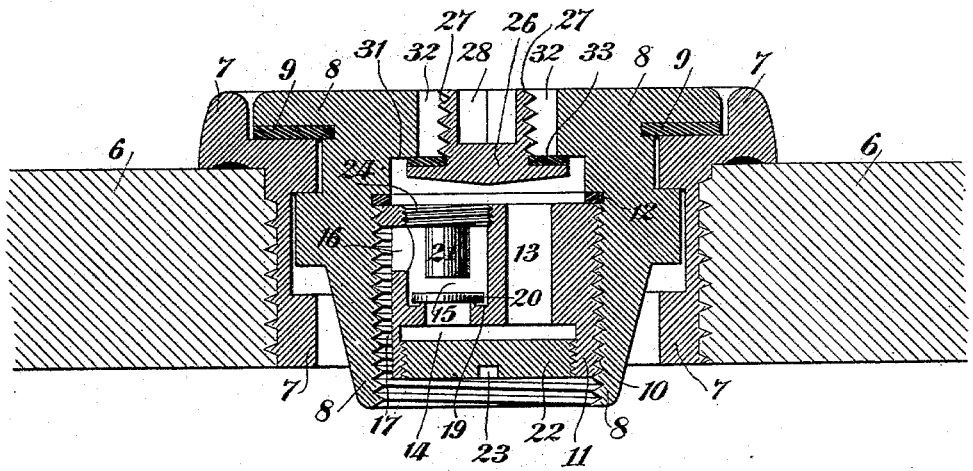
*Fig. 2,*
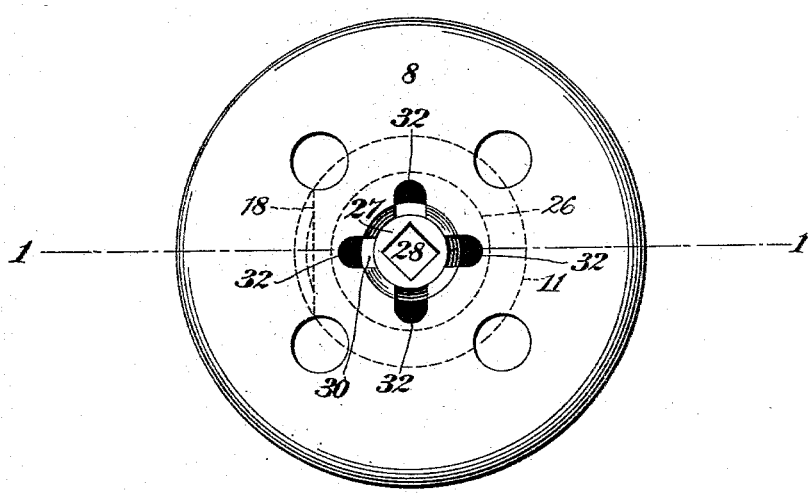
Witnesses
C. E. Ashley
John P. Nordstrom
Inventor
Harry W. Stone,
By his Attorneys
Fowler & Fowler (No Model.) 2 Sheets—Sheet 2.

H. W. STONE.
SELF VENTING BUNG.

No. 511,065. Patented Dec. 19, 1893.

Witnesses
C. E. Ashley
John P. Nordstrom

Inventor
Harry W. Stone.
By his Attorneys
Fowler & Fowler.

United States Patent Office.

HARRY W. STONE, OF BROOKLYN, ASSIGNOR TO THE BREWERS' METALLIC BUNG COMPANY, OF NEW YORK, N. Y.

SELF-VENTING BUNG.

SPECIFICATION forming part of Letters Patent No. 511,065, dated December 19, 1893.

Application filed December 22, 1892. Serial No. 456,032. (No model.)

*To all whom it may concern:*

Be it known that I, HARRY W. STONE, a citizen of the United States, residing at the city of Brooklyn, county of Kings, and State of New York, have invented certain new and useful Improvements in Self-Venting Bungs; of which the following is such a full, clear, and exact description, as will enable any one skilled in the art to which it appertains to make and use the same, reference being had to the accompanying drawings, forming part of this specification.

My invention relates especially to what is known as a self-venting bung that is used, for instance, with a beer keg or barrel, for the purpose of admitting thereto the requisite quantity of air to destroy the vacuum produced by drawing liquid from the vessel, and at the same time preventing the gases escaping from the vessel.

The chief objects of the invention are to provide an efficient form of the device which may be relied upon to act automatically when adjusted for use, and which will withstand the rough usage to which it is constantly subjected so that it will be practically impossible to incapacitate the bung by an accidental blow or knock.

The invention consists in the various novel and peculiar arrangements and combinations of the several parts of the device, all hereinafter fully described and then pointed out in the claims.

I have illustrated a type of my invention in the accompanying drawings, wherein—

Figure 3:
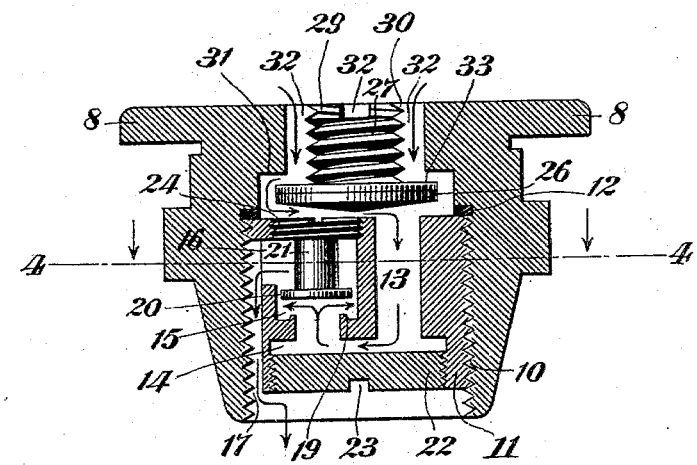
Figure 4:
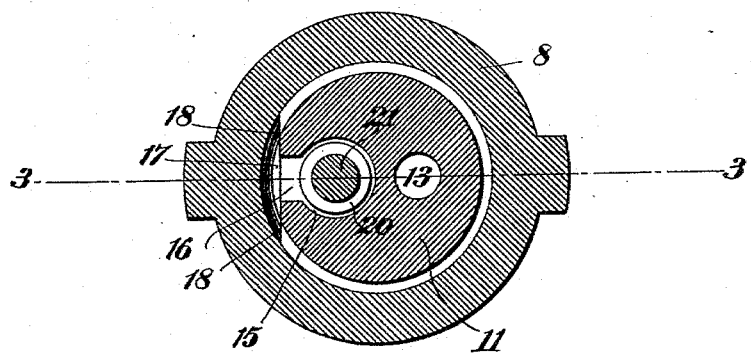

Figure 1, is a view of my improved bung on a section taken vertically and centrally through the same, on a plane indicated by line 1—1 Fig. 2. In this view the device is shown as closed, and a part of the bung stave is also shown. Fig. 2, is a top plan view of the device detached from the bung stave, with the collar 7 omitted. Fig. 3, is a view similar to Fig. 1, but with the collar or bushing 7, and the bung stave omitted and the bung shown as open, the plane of this section being indicated by line 3—3, Fig. 4. This view is somewhat diagrammatic in character in order to clearly show the course of the inflowing air, which is indicated by arrows. Fig. 4, is a view of a horizontal section, the plane of which is indicated by line 4—4 Fig. 3.

Referring to the drawings in which like numbers of reference designate like parts throughout, 6 indicates the bung stave in which is mounted a bushing or collar 7, which extends through it from the exterior to the interior thereof. Within the bushing 7, is detachably placed a tubular casing 8, in such a manner as to make a fluid tight joint—a washer 9 being interposed between the parts for this purpose.

The lower interior part 10, of the casing, is adapted to receive a plug 11, which may be screwed therein as shown. Since the plug contains the air passage in which is located the inner and automatic valve, it is preferable to make the plug separate from the casing, as shown. When the plug is mounted in the casing by a screw joint, the screw-thread on the exterior thereof is made to fit that on the interior of the casing. This plug remains fixed when set in place, and it closes up the interior opening of the casing between which and the plug is arranged a gasket 12. An air passage is formed through the plug from the top to the bottom thereof. In the present construction this air passage is shown as comprising a vertical channel 13, leading from the upper face of the plug down to near the bottom thereof, and a communicating horizontally-disposed duct 14, which in turn connects with an upwardly leading chamber 15, which by means of a lateral opening 16, leads into a peripheral duct 17, of the plug, the latter duct being formed by a flat surface 18, on the exterior of the plug together with the interior wall of the casing lying adjacent thereto. Of course the duct 17 may lead through the body of the plug instead of being formed on its surface, but the latter form simplifies and cheapens the construction and, moreover, reduces the diameter of the plug, which would otherwise have to be greater. Within the chamber 15, is arranged a valve-seat 19, for receiving the flat disk shaped valve 20, which is of smaller diameter than the chamber within which it works, so that the air may pass around it when raised from its seat. The throw of this valve is limited by a stop 21, which prevents the valve from moving up beyond the lateral opening 16. When performing its duties the bung usually assumes the position shown in Figs. 1 and 3, and as the valve is thus left free to move it will quickly gravitate into closed position when it is necessary for it to do so. By virtue of this vertically moving gravity valve, there is little or no liability of the valve failing to close and seal the air passage at the proper time and thus the efficiency of the bung as an automatic device is assured.

For convenience in making the air passage through the plug, especially when the same is bored or reamed out of the material of the plug, I make the plug with a removable bottom plate 22, which is formed with a screw-thread and fits into a corresponding thread in the plug—the slit 23 being formed in the bottom plate for receiving the blade of the screw-driver when applying or detaching the plate. I also secure the top 24, of the valve chamber, in place by a screw joint and preferably formed therewith the valve-stop 21. In this way it will be found easy to inspect, repair and clean the air passage, and also to insert or remove the valve; but I do not limit myself to securing in this way either the bottom plate 22 or the top plate 24, since other ways may be adopted. As a precautionary measure against the removal of the bottom plate 22, and top plate 24, by any one who might detach the plug, I prefer to solder these plates in place after the valve 20, has been mounted in position.

The outer and hand operated valve 26, for controlling the outer opening of the air passage of the vent-plug is located above the plug and is mounted within the casing 8, so as to be capable of vertical adjustment by a key and at the same time be housed or partly incased in order that all possibility of its being struck by any object may be avoided. In the construction shown, this valve is provided with a stem 27, having an external screw thread and formed in its end with a key socket or recess 28, which is adapted to receive the angular end of a suitable instrument or key and be thereby turned down or up as desired. The thread of the valve stem 27, works in a screw thread 29, formed around the interior walls of the upper part 30, of the interior opening of casing 8. The part 30, of said opening, is reduced in diameter as compared with the lower part and thus there is provided an annular shoulder 31, against which the upper face of the valve 26, plays as a valve-seat. In the walls of the upper part 30 of said opening and across the screw-threads 29, I form several vertical grooves, 32, 32, which serve to freely admit the exterior air to the outer valve and thence on through the air passage, when said outer valve is open. The face of the valve 26, is provided with a rubber gasket or washer 33, to more effectually seal the exterior opening of the device.

In using the device, when it is desired to place the bung in condition to automatically admit air to the vessel to replace the liquid drawn therefrom, a key with a square or angular end is inserted in the socket 28, and the valve which is normally screwed up to its highest point, is turned down sufficiently to open it and then the device is left to act for itself. This adjustment of the outer valve places these parts in the relative positions shown in Figs. 3 and 4. Under this condition, when a quantity of liquid is drawn from the vessel, the air within becomes rarefied and this causes the atmospheric pressure to raise the inner valve 20, from its seat and thus permit a sufficient quantity of exterior air to flow in through the air passage into the vessel, as per the arrows Fig. 3, until the pressure is about balanced, at which time the gases within the vessel will force the valve 20, to its seat and automatically shut off further admission of air and also prevent escape of the gases from the vessel. If now it is desired to securely close up the bung, the key is inserted in the socket of the stem of the outer valve and it is screwed up to its highest point so as to close it.

It will be noted that when the outer valve 26 is closed, it is housed by the casing 8 and lies out of reach of any ordinary object with which the bung might collide in moving the vessel about, and although it would be possible for some sharp object to be accidentally forced in against the valve, the fact that the valve is mounted by means of a screw joint, would well enable it to withstand such a blow.

Having thus described my improvements in self-venting bungs, what I claim as my invention, and desire to secure by Letters Patent, is—

1. In a self-venting bung, the combination of a casing having an air-passage extending through it, an inner automatic-valve located in said passage for preventing an outflow of gas or liquid, an annular valve-seat formed within said air-passage near the outer end thereof and an outer hand-operated valve within said air-passage arranged intermedially with respect to said valve-seat and said inner valve, substantially as, and for the purpose set forth.

2. In a self-venting bung, the combination of a casing having an air-passage extending through it, and an inner automatic-valve located in said passage for checking the outflow of gas or liquid, the upper end of said passage being contracted or formed of less diameter than the part below it thereby forming an annular valve-seat, the contracted portion of said passage being provided with a screw-thread and having air-grooves or ducts formed in the walls thereof and leading from said valve-seat to the exterior of said casing, a hand-operated disk-valve disposed beneath said valve-seat between the same and said automatic-valve, and provided with a threaded valve-stem projecting upwardly through said annular valve-seat into the said contracted portion of the air-passage, substantially as and for the purpose set forth.

3. In a self-venting bung, the combination of a casing having in its lower end a plug formed with an air passage, and an inner automatic valve located in said air passage, the interior of the upper end of said casing being provided with an annular valve seat, and a hand-operated valve located between said valve seat and said plug and having a prescribed range of movement limited on the one hand by the valve seat and on the other by the plug, whereby said hand-operated valve is prevented from being dislodged from its place; substantially as described.

4. In a self-venting bung, the combination of a casing, a plug closing said casing and provided with an air passage leading downwardly from the upper face of the plug thence across the plug and upwardly to a point on its side where it communicates with a duct formed between the exterior of the plug and the interior wall of the casing, an automatic valve located within said air passage, and an outer hand-operated valve mounted in said casing above the plug and controlling the exterior opening of the air passage of the plug.

5. In a self-venting bung, the combination of a plug provided with an air passage extending through it, and comprising channels 13 and 14, a communicating chamber 15, having a lateral opening 16, and a peripheral duct 17, an automatic valve located in said chamber 15, and an outer hand-operated valve for controlling the exterior opening of said air passage.

6. In a self-venting bung, the combination of a casing, a plug closing said casing and having an air passage through it, an automatic valve located in said air passage, said casing provided near the upper part of its interior with a screw-thread 29, and air grooves 32, 32, an outer hand valve 26, provided with a screw stem 27, taking in the thread 29 of the casing, substantially as and for the purpose set forth.

In testimony whereof I have hereunto set my hand, this 17th day of December, 1892, in the presence of two subscribing witnesses.

HARRY W. STONE.

Witnesses:
FRANK W. RANDALL,
WILLIS FOWLER.